United States Patent
Jarrad

[19]

[11] Patent Number: 6,047,197

[45] Date of Patent: *Apr. 4, 2000

[54] ICON DRIVEN PHONE MENU SYSTEM

[75] Inventor: Salah Khalil Jarrad, Apex, N.C.

[73] Assignee: Ericsson Inc., Research Triangle Park, N.C.

[*] Notice: This patent issued on a continued prosecution application filed under 37 CFR 1.53(d), and is subject to the twenty year patent term provisions of 35 U.S.C. 154(a)(2).

[21] Appl. No.: 08/777,302

[22] Filed: Dec. 27, 1996

[51] Int. Cl.[7] .................................................. H04Q 7/20
[52] U.S. Cl. .................................................. 455/566
[58] Field of Search .................... 455/566, 154.2, 455/158.4, 564, 556, 557; 379/88.11, 88.3; 340/825.44

[56] References Cited

U.S. PATENT DOCUMENTS

| | | | |
|---|---|---|---|
| 5,182,553 | 1/1993 | Kung | 340/825.44 |
| 5,327,486 | 7/1994 | Wolff et al. | 379/93.23 |
| 5,561,705 | 10/1996 | Allard et al. | 455/564 |
| 5,596,697 | 1/1997 | Foster et al. | 395/340 |
| 5,742,912 | 4/1998 | Nishiyama et al. | 455/566 |
| 5,797,089 | 8/1998 | Nguyen | 455/403 |
| 5,848,356 | 12/1998 | Jambhekar et al. | 455/403 |

FOREIGN PATENT DOCUMENTS

| | | |
|---|---|---|
| 0 651 544 A2 | 5/1995 | European Pat. Off. . |
| 0 698 845 A1 | 2/1996 | European Pat. Off. . |
| PCT/US97/ 24175 | 12/1997 | WIPO . |

OTHER PUBLICATIONS

Zenith Data Systems, Microsoft Word for Windows Ver. 6.0 Manual, p. 29, 1993.

*Primary Examiner*—Daniel S. Hunter
*Assistant Examiner*—Myron K. Wyche
*Attorney, Agent, or Firm*—Jenkens & Gilchrist, P.C.

[57] ABSTRACT

A cellular phone includes a five way switch for indicating cursor movements on a display in one of four directions and for selecting an application represented by an icon on the display at which the cursor is currently placed. The phone also includes a display mode selector to allow the user to select one of two display modes. The first display mode presents icons representing applications arranged in rows and columns. The second display mode the icons with an associated text.

12 Claims, 3 Drawing Sheets

和,047,197

ICON DRIVEN PHONE MENU SYSTEM

BACKGROUND OF THE INVENTION

1. Technical Field of the Invention

The present invention relates to cellular telephones and, in particular, to display systems for cellular telephones.

2. Description of Related Art

Cellular telephones are increasingly becoming more sophisticated and, consequently, more complex and difficult to use. More specifically, the number of user features provided by cellular telephones are increasing at dramatic rates. These features create several design challenges for cellular telephone manufacturers. On one hand, there is a demand for telephones to have a minimal number of buttons. One reason is that consumers want small telephones. Increasing the number of buttons increases the size and weight of the telephone. Additionally, a telephone with too many buttons intimidates many people that are not comfortable with modern technology and its complexity. Thus, to satisfy those users that "don't want all those fancy features", a cellular phone is needed which appears to do little more than dial numbers.

As a result, telephone designers are creating a user interface in which applications or telephone functions are selectable through comprehensive menu systems. It is believed however, that many functions and applications are not used as frequently they might be because of the menu driven user interface. There are several reasons for this. First, many users are not aware of the large number of the telephone features that are available. The reason is that menu systems on telephones are text based lists of features. A user must, therefore, select a list and then scroll from top to bottom of the display screen to find a specified feature. Obviously, having large numbers of user features on the telephone results in the number and length of the lists being large.

As a result of the trend to create multiple lists of user features, some of which can be large, many features are not used simply because the arrangement of menu options requires that those features be discovered by one bold and interested enough to press buttons on the cellular telephone to see what happens. User features are also not used in some instances even if a user is aware that a telephone has a specified feature. One reason is that it is frequently difficult to remember how to find and then activate the feature. Thus, current telephones have menu systems which are not intuitive and whose selectable functions are not always easy to find.

Another problem with current menu systems is that there is a need to develop universal menu systems which may be readily understood by people having differing native tongues. In the European market, for example, a telephone having text only menus must have the capability of displaying the menus in multiple languages so that users in different countries may properly understand the menu selections. As may readily be appreciated, developing menu systems in multiple languages increases system complexity as well as the user interface. What is needed, therefore, is a cellular telephone having a user interface whose menu system is user friendly and which allows for quicker feature selection in a manner which is largely independent of language.

SUMMARY OF THE INVENTION

A cellular telephone includes a dual display mode in which icons are used to select and activate telephone functions and applications. In a first display mode, icons are displayed in a plurality of rows and columns to allow a user the ability to navigate the icon menus in two-dimensional directions. A positioning switch is provided which supports the two dimensional scrolling and icon selection in the preferred embodiment. The cellular phone also includes the capability of displaying a text window superimposed over the icon menus. The text window is displayed upon user selection to identify the application represented by the icon at which the cursor is currently located. In the preferred embodiment, a switch on the telephone causes the text window to appear whenever the switch is depressed. In a second display mode, the icons are displayed on one side of the cellular phone display. A text field is then placed adjacent to each icon for displaying text which identifies the application or function represented by the icon. Selection of the first or second display mode may be performed either by a dedicated hardwired switch or by a software switch.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF THE DRAWINGS

Figure 1:
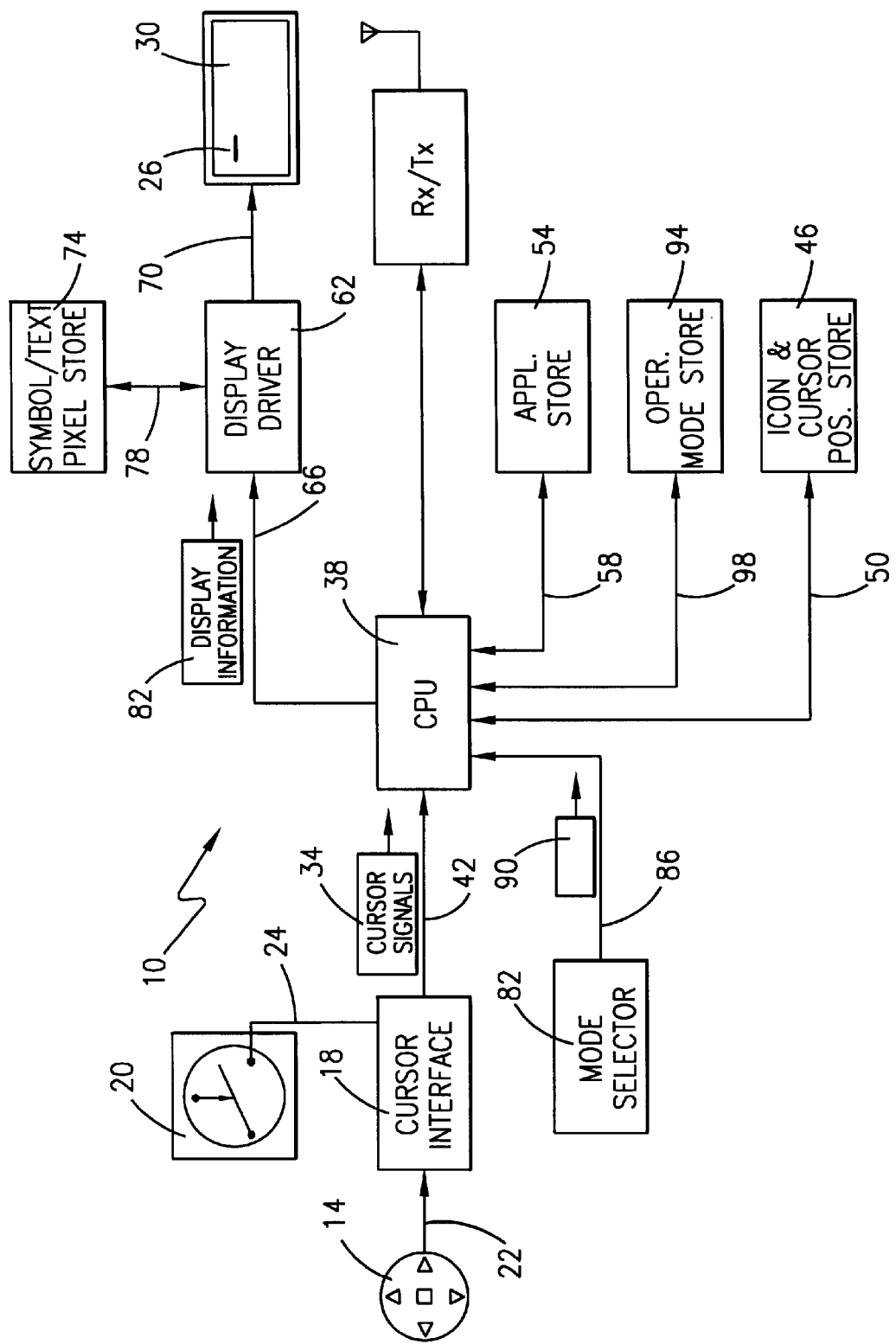
FIG. 1 is a functional block diagram of a cellular phone according to a preferred embodiment of the invention herein.

FIG. 1 is a functional block diagram of a cellular phone according to a preferred embodiment of the invention. Referring now to FIG. 1, phone 10 includes a cursor switch 14 which is connected to cursor interface 18 by line 22. Cursor interface 18 is operable to receive signals from cursor switch 14 over line 22 and to output cursor signals 34 to central processing unit (CPU) 38 over line 42. Cursor signals 34 include signals which specify desired cursor movement and whether an application or function has been selected by the user. Accordingly, using cursor switch 14, a direction in which the user desires a cursor 26 on a display 30 to move may be specified. Cursor switch 14 is also used for specifying that the user has selected an application or function represented by an icon on display 30. As may be seen, switch 20 is also connected to cursor interface 18 by line 24. Switch 20 is for requesting a text overlay to appear at the present location of the cursor. Accordingly cursor signals 34 includes a signal reflecting that switch 20 has been activated.

In the embodiment illustrated in FIG. 1, cursor switch 14 is a five way switch. Cursor switch 14 may be toggled in any one of four directions (e.g., north, east, south or west, figuratively) or depressed. Switch 14 activates the "select" function when it is depressed. As an alternate embodiment, the "select" function can be performed by a separate switch thereby only requiring a four way, instead of a five way, cursor switch. In two other embodiments, separate switches are used to indicate the desired directions of movement. In a first embodiment of a system using a plurality of switches to indicate movement direction, five separate switches are used. One switch is used to indicate "select" and one switch is used for each of the four directions. In the second embodiment, 3 separate switches are used. Here, one switch is used to select, one switch is used to select "north" or "south", and one switch is used to select "east" or "west", figuratively. For each of these embodiments, CPU 38 communicates with a logical keypad device driver which, in turn, communicates with a physical keypad device driver to interpret keystrokes in a manner as is known to those skilled in the art.

CPU 38 is also connected to icon and cursor position store 46 by line 50 and to application store 54 by line 58. Icon and cursor position store 46 stores an icon menu as well as the position of the various icons being 0displayed on display 30. An icon menu is a list of icons (by name or ID number and a display coordinate in relationship to display mode). Icon position store 46 also stores the position of cursor 26 on display 30. Application store 54 stores programming signals for each application which is selectable through the icon menus. Accordingly, whenever a select signal is received, the cursor position and the various icon positions may be used by CPU 38 to determine which application is being selected.

CPU 38 is also connected to display driver 62 by line 66. Display driver 62 generates pixel level display signals to display 30 over line 70. As may be seen, display driver 62 is also connected to pixel store 74 by line 78. Pixel store 74 provides the specific pixel display information to display driver 62. When display driver receives display information signal 82 over line 66 from CPU 38, it determines what symbols, figures or text are to be displayed on display 30. Display driver 62 then communicates with pixel store 74 over line 78 to determine what pixels are to be illuminated on display 30.

Phone 10 also includes a mode selector 82 which is connected to CPU 38 by line 86. Mode selector 82 is operable to output a mode signal 90. Mode signal 90 has a first state which specifies a first mode of operation and a second state which specifies a second mode of operation. CPU 38 receives mode signal 90 and is operable to interpret the mode signal and to store a signal in operational mode store 94 which reflects the selected operational mode. CPU 38 transmits the signal which reflects the operational mode to operational mode store 94 over line 98.

Regarding the of operation, multiple embodiments are possible. By way of example, mode selector 82 could be implemented as a software switch. One way of implementing a software switch is to create an icon for the mode wherein selection of the icon causes the selected display mode to toggle between the first and second display modes of operation. Another way of implementing a software switch is to program CPU 38 to recognize a specified sequence of key entries on a keypad (not explicitly shown) of phone 10. In another embodiment, mode selector 82 comprises a dedicated key which is used to cause phone 10 to toggle between display modes. Accordingly, mode selector 82 represents common hardware/software systems for recognizing a specified request.

In operation, phone 10 serves to allow a user to select a display mode of operation using mode selector 82. In a first display mode of operation, CPU 38 transmits display information signals 82 to display driver 62 which cause display driver to display a plurality of rows and columns of icons on display 30. See, FIG. 2. In a second mode of operation, CPU 38 transmits display information signals 82 to display driver 62 which cause display driver to display a column of icons and a corresponding column of text which defines a specified function or application which is performed whenever the corresponding icon is selected. See, FIG. 3. Whether phone 10 operates in a first or in a second mode of operation depends upon the selected state of mode selector 82 and the mode select signal generated therefrom.

Figure 2:
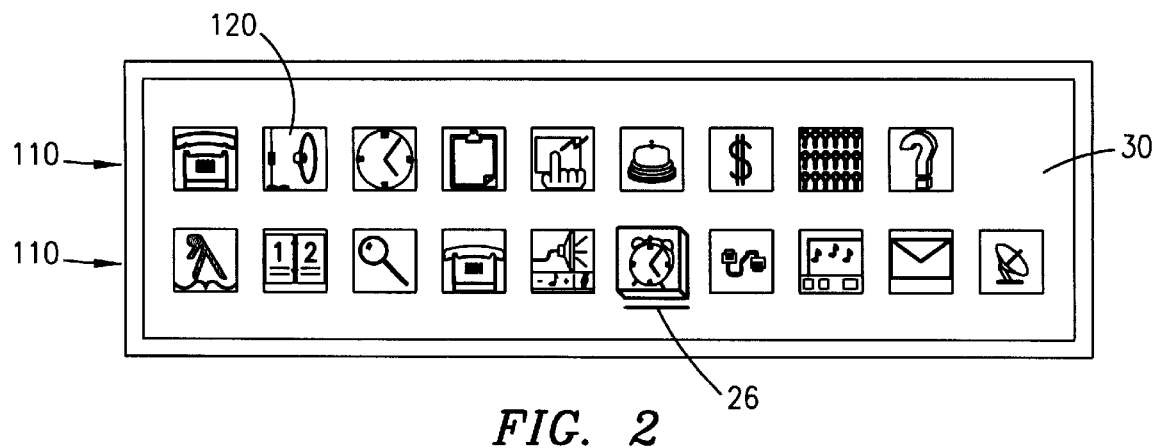
FIG. 2 is a cellular phone display which illustrates a first display mode of operation according to a first embodiment of the invention.
Figure 3:
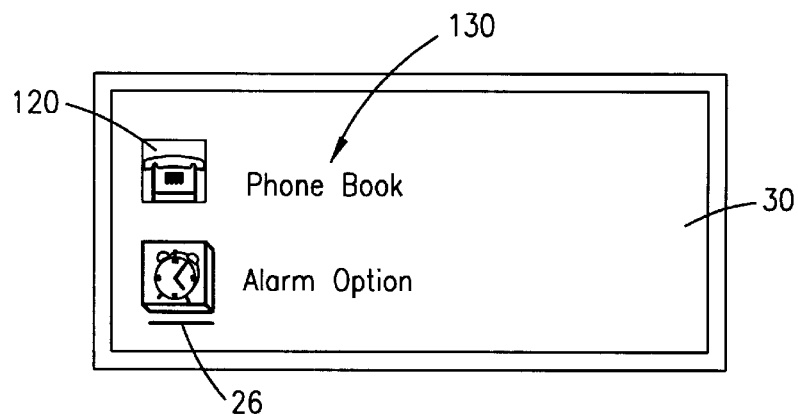
FIG. 3 is a cellular phone display which illustrates a second display mode of operation according to a second embodiment of the invention.

In order to better understand the different display modes of operation and their selection, it is helpful to compare the two display modes to each other. FIGS. 2 and 3 illustrate two possible displays embodiments of phone 10. More specifically, FIG. 2 is a cellular phone display which illustrates a display mode of operation according to a first embodiment of the invention. Referring now to FIG. 2, one may observe that display 30 is displaying two rows 110 of icons, each row 110 having 10 locations each for displaying an icon 120. Note, however, that the top row 110 only has nine icons 120 being displayed while the second row 110 has ten icons 110 being displayed. An advantage of the display of FIG. 2 is that a user may view up to twenty icons 110 (applications) at once without having to scroll the display on the screen of display 30. Accordingly, a user may select between icons 110 more readily.

FIG. 3 is a cellular phone display which illustrates a display mode of operation according to a second embodiment of the invention wherein there is but one column of icons 120. Each icon 120 is left justified on display 30. Adjacent to each icon, a text field 130 describes or identifies the application represented by the icon. A shortcoming of the display arrangement shown in FIG. 2 is that there is no text to describe or identify the function or application represented by the icon. This shortcoming is solved by having the text field 130 in the second display mode illustrated in FIG. 3. Accordingly, without further action, a user must be able to remember the function represented by the icons.

Figure 4:
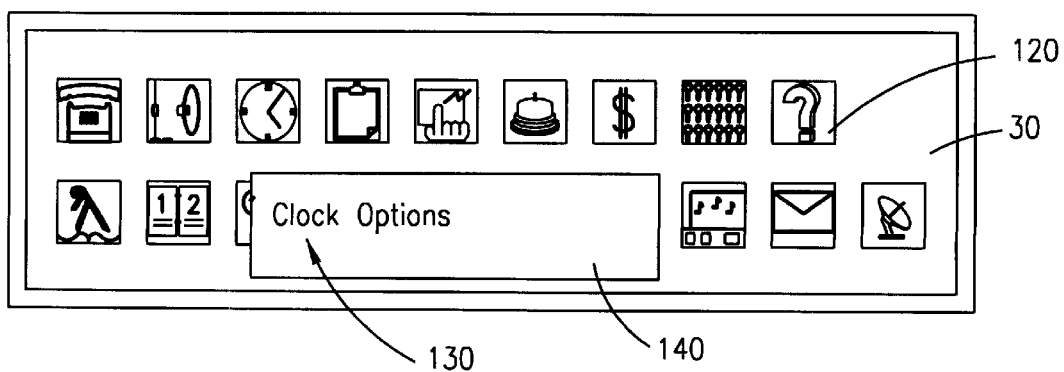
FIG. 4 is a cellular phone display which illustrates another aspect of the first display mode of operation according to the first embodiment of the invention.

FIG. 4 is a cellular phone display which illustrates another aspect of the first display mode of operation according to the first embodiment of the invention. Comparing FIGS. 2 and 3, display 30 does not ordinarily provide text. Referring now to FIG. 4, an overlay window 140 includes a text field 130 which identifies the function or application of the icon at which the cursor is presently located. This text within text field 130 is similar to the text shown adjacent to the icons in FIG. 3.

While a software button may be used to cause the window 140 to appear, switch 20 is used in the preferred embodiment. Depression of switch 20 allows a user to easily cause the information window to appear for the selected icon 120. When switch 20 is depressed a signal is received by cursor interface 18 over line 24. To illustrate, cursor 26 of FIG. 1 is shown at the alarm options icon in both FIGS. 2 and 3. As may be seen, display graphics are used to emphasize the icon at which the cursor is located. Once switch 20 of FIG. 1 is depressed, a text overlay window 140 appears over the alarm options icon.

Figure 5:
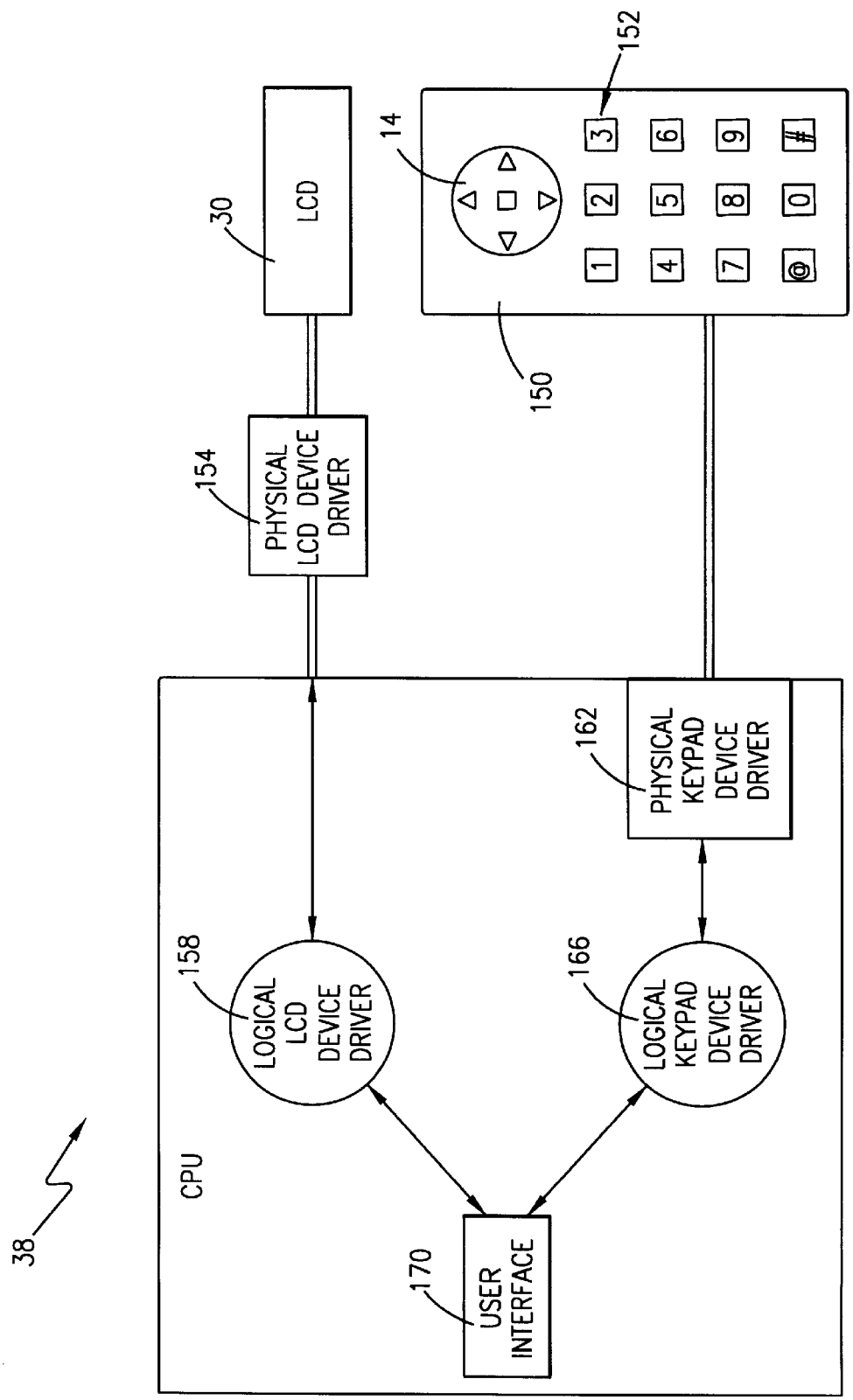
FIG. 5 is a functional block diagram illustrating a preferred embodiment of the physical and logical LCD and keypad drivers in relation to an LCD and a keypad.

FIG. 5 is a functional block diagram illustrating a preferred embodiment of the physical and logical LCD and keypad drivers in relation to an LCD and a keypad. Referring now to FIG. 5, CPU 38 is connected to physical LCD device driver 154 which in turn is connected to LCD 30. Physical LCD device driver 154 is operable to transmit signals to LCD 30 to cause elements within LCD 30 to be illuminated. Physical LCD device driver 154 also is operable to transmit signals to CPU 38 to reflect an LCD column, row and displayed window. Accordingly, logical LCD device driver 158 receives the signals which reflect the LCD column, row and displayed window and determines a corresponding logical display keycode.

Similarly, physical keypad device driver 162 is connected to receive from keypad 150 signals corresponding to a depression of a key 152. The received signals are then translated to physical keycodes by physical keypad device driver 162. Logical keypad device driver is connected to receive the physical keycodes from physical keypad device driver 162 and to map the physical keycode into a logical keycode associated with a software controlled user feature.

Continuing to refer to FIG. 5, user interface 170 is connected to receive the logical keycodes from logical keypad device driver 166 and the logical display keycode from logical LCD device driver 158. User interface 170 is operable to determine, based upon the received logical keycodes from the LCD and keypad drivers, what user function is selected by a user and at what location a cursor is located regardless of whether a selection is made.

Although an embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A cellular phone, comprising:

display means for displaying a cursor, icons, and text windows associated with the icons on a display;

control means for transmitting control signals to the display means, the control means coupled to the display means, the control signals for causing the display means to display the icons and the text windows in one of at least two specified display modes of operation, wherein the first display mode of operation displays only the icons on the display and wherein a second display mode of operation displays both the icons and a select one of the text windows overlaid over a corresponding select one of the icons; and at least one switch adapted to be toggled and depressed, toggling of said at least one switch causing cursor signals to be transmitted to the control means, the cursor signals reflecting movement of the cursor across the display, depression of said at least one switch only once causing the control means to transmit the control signals for the second display mode of operation when the cursor signals indicate that the cursor is proximate to the select one of the icons.

2. The cellular phone of claim 1 wherein said control means includes a physical LCD device driver for generating information signals reflecting the cursor's column, row and displayed windows.

3. The cellular phone of claim 2 wherein said control means further includes a logical LCD device driver coupled to receive the information signals and for generating a logical display keycode.

4. The cellular phone of claim 3 wherein said control means further includes a physical keypad device driver coupled to receive keypad signals, the physical keypad device driver for generating physical keypad keycodes.

5. The cellular phone of claim 4 wherein said control means further includes a logical keypad device driver coupled to receive the physical keypad keycodes, the logical keypad device driver for generating a logical keypad keycode.

6. The cellular phone of claim 5 wherein said control means further includes a logic device coupled to receive the logical display keycode and the logical keypad keycode, the logic device for controlling the cursor means and application selection based upon the received logical display keycodes and keypad keycodes.

7. The cellular phone of claim 6 wherein said at least one switch further includes at least one switch for reflecting cursor movement and a separate switch being depressed only once to indicate selection of the second display mode of operation.

8. The cellular phone of claim 6 wherein said at least one switch further includes a four-way switch for indicating cursor movement and a separate switch being depressed only once to indicate selection of the second display mode of operation.

9. The cellular phone of claim 6 wherein said at least one switch further includes two two-way switches for indicating cursor movement and a separate switch being depressed only once to indicate selection of the second display mode of operation.

10. The cellular phone of claim 6 wherein said at least one switch further includes five additional switches, four of the additional switches for reflecting cursor movement direction and one of the additional switches being depressed only once to indicate selection of the second display mode of operation.

11. A method for displaying icons and associated text windows on a display of a cellular phone, comprising the steps of:

toggling at least one switch causing cursor signals to be transmitted to a control device within the cellular phone, the cursor signals reflecting movement of a cursor across the display;

displaying, by the control device, only the icons on the display when the cursor signals indicate that the cursor is not proximate to any of the icons; and displaying, by the control device, the icons and a select one of the text windows overlaid over a corresponding select one of the icons on the display when the cursor signals indicate that the cursor is proximate to the select icon and said at least one switch is depressed only once.

12. The method of claim 11 wherein the step of displaying only the icons includes the step of displaying the icons in a plurality of rows and columns.

\* \* \* \* \*

UNITED STATES PATENT AND TRADEMARK OFFICE
CERTIFICATE OF CORRECTION

PATENT NO : 6,047,197
DATED : April 4, 2000
INVENTOR(S): Saleh Khalil Jarrad

It is certified that error appears in the above-identified patent and that said Letters Patent are hereby corrected as shown below:

Column 3, line 20    Replace "0displayed"
                     With --displayed--

Signed and Sealed this

Twenty-second Day of May, 2001

Attest:

NICHOLAS P. GODICI

*Attesting Officer*    *Acting Director of the United States Patent and Trademark Office*